United States Patent [19]

Patella et al.

[11] 4,022,743

[45] May 10, 1977

[54] AQUEOUS DISPERSIONS OF VINYL ACETATE/POLYACRYLATE ESTER OF PENTAERYTHRITOL/HYDROXYMETHYL DIACETONE ACRYLAMIDE COPOLYMERS HAVING IMPROVED ADHESION PROPERTIES

[75] Inventors: Ralph F. Patella, South Plainfield; Joseph A. Vona, Westfield, both of N.J.

[73] Assignee: Celanese Corporation, Louisville, Ky.

[22] Filed: Nov. 28, 1975

[21] Appl. No.: 635,816

Related U.S. Application Data

[63] Continuation-in-part of Ser. No. 529,649, Dec. 4, 1974, abandoned.

[52] U.S. Cl. .................. 260/29.6 T; 260/29.6 TA; 260/63 UY
[51] Int. Cl.$^2$ ................. C08F 28/08; C08L 31/04; C09D 5/00
[58] Field of Search .............. 260/29.6 TA, 29.6 H, 260/29.6 T, 33.4 R

[56] References Cited

UNITED STATES PATENTS

| | | | |
|---|---|---|---|
| 2,755,237 | 8/1973 | Isaacs et al. | 260/29.6 TA |
| 3,736,287 | 5/1973 | Patella | 260/29.6 TA |
| 3,935,131 | 1/1976 | Sharman | 260/29.6 TA |

*Primary Examiner*—Joseph L. Schofer
*Assistant Examiner*—Peter F. Kulkosky
*Attorney, Agent, or Firm*—Herbert P. Price; K. A. Genoni; T. J. Morgan

[57] ABSTRACT

Vinyl acetate based aqueous dispersion having improved wet adhesion properties are prepared by copolymerizing vinyl acetate with about 3 to about 10 percent by weight of a polyacrylate ester and about 0.5 to 3 percent by weight of hydroxymethyl diacetone acrylamide, said percentages being based on the total weight of the copolymer. Optionally, other monomers copolymerizable therewith can be included in the copolymer. Aqueous dispersions of this invention have utility as vehicles in protective coating formulations.

8 Claims, No Drawings

AQUEOUS DISPERSIONS OF VINYL ACETATE/POLYACRYLATE ESTER OF PENTAERYTHRITOL/HYDROXYMETHYL DIACETONE ACRYLAMIDE COPOLYMERS HAVING IMPROVED ADHESION PROPERTIES

CROSS REFERENCE TO RELATED APPLICATIONS

This application is a continuation-in-part of our application, Ser. No. 529,649, filed Dec. 4, 1974 (now abandoned).

BACKGROUND OF THE INVENTION

The field of art to which this invention relates is, aqueous dispersions of synthetic polymers obtained by polymerizing ethylenically unsaturated monomers. In particular, the field of art of this invention is vinyl acetate copolymer dispersions having improved adhesion properties when formulated into protective coatings.

Aqueous dispersions containing homopolymers and copolymers of vinyl acetate have been known for many years. Films of these polymers normally exhibit excellent appearance and durability. However, when pigmented and formed into paints, these compositions do not generally have good adhesion properties, particularly wet adhesion and blister resistance.

While many monomers and processes have been investigated for improving the adhesion of these coatings, no completely satisfactory method has yet been found. Many prior art adhesion improving monomers were either too expensive or were of limited usefullness due to deficiencies in other paint properties brought about by their use. In addition, many of the prior art processes for preparing paints having improved adhesion are time-consuming and require expensive modifications in processing equipment.

These and other difficulties are overcome by preparing the aqueous dispersions of the instant invention, which exhibit generally improved adhesion properties over prior art dispersions which are not so modified.

SUMMARY OF INVENTION

This invention relates to aqueous dispersions of synthetic polymers which are useful in paint formulations. In particular time invention pertains to aqueous dispersions of copolymers of vinyl acetate. More particularly, this invention relates to aqueous copolymer dispersion coating compositions made from a copolymer of vinyl acetate dispersed in water in the presence of an anionic or nonionic surfactant or mixture thereof wherein comonomers with the vinyl acetate are about 3 to about 10 percent by weight, based on the weight of the copolymer, of a polyacrylate ester and about 0.5 to about 3 percent by weight, based on the weight of the copolymer, of hydroxymethyl diacetone acrylamide plus, optionally, another monomer copolymerizable therewith.

DETAILED DESCRIPTION OF THE INVENTION

The primary monomers used in preparing the aqueous copolymer dispersion of this invention are vinyl acetate, a polyacrylate ester and hydroxymethyl diacetone acrylamide. The polyacrylate esters used in this invention are the tri-, and tetra-esters of tri-, and tetra primary aliphatic alcohols. Examples of such esters are trimethylol propane triacrylate, trimethylol ethane triacrylate, pentaerythritol triacrylate, and pentaerythritol tetraacrylate. Additional esters useful in this invention are the polymethacrylate esters of polyalcohols which for the purpose of this invention are included within the generic name - polyacrylate esters. Examples of such esters are trimethylol ethane trimethacrylate, trimethylol propane trimethacrylate and pentaerythritol trimethacrylate. Mixtures of the various polyacrylate esters can also be utilized in this invention.

The other component of the copolymer of this invention is hydroxymethyl diacetone acrylamide. This monomer is derived from diacetone acrylamide, or N-(1,1-dimethyl-3-oxobutyl)acrylamide. Formaldehyde reacts with the alpha methyl and methylene groups of dimethyloxybutylacrylamide to form hydroxymethyl derivatives. The amount of formaldehyde used, the pH, and the temperature determines the composition of the product. Diacetone acrylamide which contains one hydroxymethyl group, or two hydroxymethyl groups or mixtures of the 1 and 2 derivatives can be used in this invention. A discussion of diacetone acrylamide and its derivatives can be found in "Encyclopedia of Polymer Science and Technology", Volume 15, pages 353–364, John Wiley & Sons, Inc. (1971).

Optionally, other monomers copolymerizable with vinyl acetate can be used in this invention. One class of such monomers are alkyl acrylate or methacrylate esters wherein the alkyl group contains from 1 to 18 carbon atoms. Examples of such monomers are the methyl, ethyl, isopropyl, n-butyl, isobutyl, tertiary butyl, hexyl, 2-ethylhexyl, decyl and stearyl esters of acrylic and methacrylic acid. Preferred monomers for use in this invention are butyl and 2-ethylhexyl acrylate.

Additional monomers which can be copolymerized with vinyl acetate in this invention are the mono- and dialkyl esters of polymerizable unsaturated dibasic acids wherein the alkyl group contains from 1 to 10 carbon atoms. Examples of such monomers are mono- and dimethyl, ethyl, butyl, hexyl, octyl, 2-ethylhexyl and decyl maleate, fumarate, itaconate and the like. A preferred monomer for use in this invention is dioctyl maleate.

The copolymer component of the aqueous dispersions of this invention contain monomers in the following weight percentages based on the total weight of the copolymers.

96.5 to 70 percent vinyl acetate;
3 to 10 percent polyacrylate ester;
0.5 to 3 percent hydroxymethyl diacetone acrylamide; and
0 to 26.5 percent other monomer copolymerizable therewith;

Preferably, the composition contain about 1.25 to about 2 weight percent hydroxymethyl diacetone acrylamide and about 3.5 to about 7 weight percent polyacrylate ester, said weight percents being based on the total weight of monomers which are copolymerized.

The monomers of the instant invention may be formed into aqueous dispersion copolymers by processes well known in the art, utilizing in order to stabilize the dispersion, various types of surfactants. These surfactants, which may also be termed emulsifying agents, dispersing agents or wetting agents, may be anionic, non-ionic, or mixtures thereof.

Among the non-ionic surfactants which can be used are polyethers, e.g., ethylene oxide and propylene oxide condensates in general, which include straight and branched-chain alkyl and alkylaryl polyethylene glycol and polypropylene glycol ethers and thioethers, and more particularly substances which are members of an homologous series of alkylphenoxypoly(ethyleneoxy) ethanols, which series can be represented by the general formula:

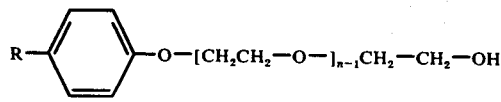

wherein R represents an alkyl radical and n represents the number of moles of ethylene oxide employed, included among which are alkylphenoxypoly(ethyleneoxy)ethanols having alkyl groups containing from about 7 to about 18 carbon atoms, inclusive, and having from about 4 to about 240 ethyleneoxy units, such as the heptylphenoxypoly(ethyleneoxy)ethanols, nonylphenoxypoly(ethyleneoxy)ethanols and dodecylphenoxypoly(ethyleneoxy)ethanols; the polyoxyalkylene derivatives of hexitol (including sorbitans, sorbides, mannitans and mannides); partial long chain fatty acid esters, such as the polyoxyalkylene derivatives of sorbitan monolaurate, sorbitan monopalmitate, sorbitan monostearate, sorbitan tristerate, sorbitan mono-oleate and sorbitan trioleate; the condensates of ethylene oxide with a hydrophobic base, said base being formed by condensing propylene oxide with propylene glycol; sulfur-containing condensates, e.g., those prepared by condensing ethylene oxide with higher alkyl mercaptans, such as nonyl, dodecyl or tetradecyl mercaptan, or with alkylthiophenols wherein the alkyl group contains from 6 to 15 carbon atoms; ethylene oxide derivatives of long-chain carboxylic acids, such as lauric, myristic, palmitic or oleic acid, or mixtures of acids, such as tall oil fatty acids; and ethylene oxide derivatives of long-chained alcohols such as octyl, decyl, lauryl or cetyl alcohols.

Among the anionic surfactants which can be used are the higher molecular weight sulfates and sulfonates, e.g., sodium and potassium alkyl, aryl and alkylaryl sulfates and sulfonates such as sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfonate, potassium methylbenzene sulfonate, sodium dodecylbenzene sulfonate, potassium toluene sulfonate, and sodium xylene sulfonate; higher fatty alcohols, e.g., stearyl, lauryl, etc., which have been ethoxylated and sulfonated; dialkyl esters of alkali metal sulfosuccinic acid salts, such as sodium diamyl sulfosuccinate, sodium dihexyl sulfosuccinate and sodium dioctyl sulfosuccinate, and formaldehyde-naphthalenesulfonic acid condensation products.

The amounts of surfactant employed in the emulsion polymerization process, will range from about 0.02 to about 10 percent, based on the total weight of the polymerizable monomer system. However, it is preferred, when using typical nonionic surfactants, e.g., those of the above-described alkylphenoxypoly(ethylenoxy)ethanols which contain from about 30 to about 100 ethyleneoxy units, or typical anionic surfactants, e.g., an ethoxylated higher fatty alcohol which has been sulfonated, to employ them in amounts ranging from about 0.1 to about 6 percent, by weight, on the above-stated basis.

The most preferred surfactants useful herein are anionic or non-ionic, or mixtures of these two.

Aside from the surfactant or surfactant mixture employed, the reaction medium can also contain small amounts of one or more protective colloids. Included among such materials are ether linkage-containing protective colloids, such as hydroxymethyl cellulose, hydroxyethyl cellulose, ethylhydroxyethyl cellulose, carboxymethyl cellulose, ethoxylated starch derivatives, and the like. However, other protective colloid-forming substances, i.e., ones containing no ether linkages, can also be used either along or together with the aforementioned ether-linkage-containing materials, and included among these are partially and fully hydrolyzed polyvinyl alcohols, polyacrylic acid, sodium and other alkali metal polyacrylates, polyacrylamide, poly(methyl vinyl ether/maleic anhydride), polyvinylpyrrolidone, water-soluble starch, glue, gelatin, water-soluble alginates such as sodium or potassium alginate, casein, agar, and natural and synthetic guns, such as gum arabic, guar and gum tragacanth. All of these materials will be used in the amounts found in conventional dispersion polymerization procedures, i.e., in amounts usually ranging from about 0.1 percent to about two percent, by weight, based on the total weight of the polymerizable system.

The dispersions prepared herein may be prepared using many of the various well known prior art dispersion polymerization methods. For example, the monomers of the invention may be pre-emulsified, utilizing al or a portion of the above-described surfactants into one or more than one pre-emulsion, and the emulsion subsequently added to the reactor either in bulk or over a period of time during the course of the reaction. Conversely, the monomers may be fed directly into the reactor in either single or multiple feeds, either pre-mixed or subsequently mixed with the initiators described hereinafter. The dispersion is formed as polymerization occurs.

The temperature utilized in carrying out the dispersion polymerization of this invention will depend to a large extent upon the initiator which has been chosen, but generally reaction temperatures will range from about room temperature up to about 100° C, or somewhat above, and can be varied as the final polymerization proceeds to substantial completion. Subatmospheric, atmospheric or super-atmospheric pressures can be employed during all or part of polymerization and, depending upon the monomers the catalysts employed, the reaction can be carried out, if desired, under an inert atmosphere, such as nitrogen, or carbon dioxide.

The monomers are polymerized by means of a catalytic amount of a conventional free radical polymerization catalyst or catalyst system (which can also be referred to as an addition polymerization catalyst, a vinyl polymerization catalyst, or a polymerization initiator), preferably, although not necessarily, one which is substantially water soluble. Among such catalysts are peroxides such as hydrogen peroxide, tertiary butyl hydroperoxide, cumene hydroperoxide; alkali metal (e.g., sodium, potassium or lithium) and ammonium persulfates, perphosphates and perborates; azonitriles, such as α, α,azobisisobutyronitrile, and redox systems, including such combinations as mixtures of hydrogen peroxide, t-butyl hydroperoxide, or the like and any of an iron salt, a titanous salt, zinc formaldehyde sulfoxylate or sodium formaldehyde sulfoxylate; an alkali metal or ammonium persulfate, borate or perchlorate together with an alkali metal bisulfite such as sodium metabisulfite; an alkali metal persulfate together with an arylphosphinic acid such as benzenephosphinic acid, and the like.

In accordance with the customary practice of the art, the amount of polymerization catalyst employed will be more than that required to obtain substantially complete monomer conversion at lowest catalyst cost.

It is also possible, when using redox catalyst systems, to dissolve the oxidant, e.g., ammonium persulfate, in the surfactant-water mixture prior to the preparation of a monomer pre-emulsion, and to then add the reductant, together with the oxidant-containing monomer pre-emulsion, to the water in which it will be polymerized.

The amount of water to which the monomers are added will be determined by the solids content desired in the finished polymer emulsion. Solids contents can range from as low as 20 percent, by weight, to as high as about 75 to 80 percent.

After the emulsion has been prepared, the reaction product is maintained at the desired pH. Depending on the surfactant, the pH may range from about 2 to about 10. PH may be adjusted using acids or bases as the case may be, i.e., hydrochloric acid or ammonium hydroxide or by using a conventional ion exchange resin.

The emulsion, as described above, may be compounded into paints, sealers, glues, or other types of plastic products utilizing conventional fillers, extenders and other components normally and customarily utilized with aqueous based emulsions systems. However, these emulsions are particularly useful as conventional water-based trade-sale paints, i.e., house paints.

The following examples will serve to illustrate the invention hereinabove described without limiting it. All parts and percentages are by weight unless otherwise indicated.

EXAMPLE 1

To a suitable reactor, equipped with a thermometer, mechanical agitator, reflux condenser and two addition funnels, were added 280 parts of deionized water and 2 parts of hydroxyethyl cellulose. To one of the addition funnels were added a pre-emulsion of 457 parts of vinyl acetate, 81 parts of butyl acrylate, 0.9 part of tertiary butyl hydroperoxide (90% active), 37.6 parts of Igepal Co-897, a nonylphenoxypoly(ethyleneoxy)- ethanol surfactant available from GAF Corporation, and 3.1 parts of Triton X-200, a sodium salt of alkylaryl polyether sulfonate surfactant available from Rohm & Haas Corporation. To the other addition funnel was added a solution of 0.68 part of sodium sulfoxylate formaldehyde in 58 parts of water.

Eight parts of the sodium sulfoxylate formaldehyde solution were added to the reactor, along with 10 parts of a 0.5% by weight solution of sodium persulfate, agitation was begun and heat was applied. When the temperature reached 65° C., slow addition of the pre-emulsion and of the sodium sulfoxylate formaldehyde solution was begun. The additions were completed after 4 hours while keeping the temperature between 65° C. and 70° C. Heating at 70° C. was continued for an additional hour and 20 minutes. The resulting product had a solids content of 53.8 percent, a Brookfield viscosity at 25° C. of 1630 cps. (No. 2 Spindle, 20 RPM), an inherent viscosity of 0.83 and a PH of 2.2.

EXAMPLE 2

Example 1 was repeated, utilizing essentially the same procedure except that 10.0 parts of hydroxymethyl diacetone acrylamide were included in the monomer pre-emulsion. There resulted a product having an inherent viscosity of 1.01.

EXAMPLE 3

Example 1 was repeated, except that ten parts of hydroxymethyl diacetone acrylamide and twenty parts of pentaerythritol triacrylate were utilized in addition to the vinyl acetate and butyl acrylate. There resulted a dispersion having a viscosity of 1080 cps., a pH of 2.4, a solids content of 54.9 weight percent, and an inherent viscosity of 0.99.

EXAMPLE 4

Example 1 was repeated, except that forty parts of pentaerythritol triacrylate and ten parts of hydroxymethyl diacetone acrylamide were included with the other monomers. There resulted a dispersion having a viscosity of 780 cps., a pH of 2.5, and a solids content of 54.2 weight percent,

EXAMPLE 5

Example 1 was repeated except for forty parts of trimethylolpropane triacrylate and ten parts of hydroxymethyl diacetone acrylamide were utilized a comonomers with the vinyl acetate and butyl acrylate. There resulted a product having a solids content of 55.1 weight percent, a viscosity of 1020 cps., and a pH of 2.1.

EXAMPLE 6

The dispersion of Example 1 was prepared except that twenty parts of pentaerythritol triacrylate were copolymerized with the vinyl acetate and butyl acrylate. There resulted a dispersion having a solids content of 54.4 weight percent, a pH of 2.3, and a viscosity of 1730 cps.

EXAMPLE 7

Example 1 was repeated except that forty parts of trimethylolpropane triacrylate were copolymerized with the vinyl acetate and butyl acrylate. There resulted a dispersion having a solids content of 55.3 weight percent, a viscosity of 1260 cps. and a pH of 2.3.

Each of the above examples were compounded into the following formulation by mixing the ingredients and grinding on a Cowles mixer for 8 hours.

Formulation

| Ingredient | Parts |
| --- | --- |
| Water | 115.0 |
| Triton CF-10 (octylphenol alkylarly polyether surfactant available from Rohm and Haas Corp.) | 2.5 |
| Ethylene glycol | 74.5 |
| Titanium dioxide pigment | 275.0 |

These materials were dispersed on the Cowles mixer, and the following were added in the following order:
Ethylene glycol

| Ethylene glycol | 37.2 |
| --- | --- |
| Ammonium hydroxide (28%) | 2.0 |
| Polymeric emulsion reduced to 46% solids | 545.00 |

| | |
|---|---|
| 2,2,4-Trimethyl-1,3-pentanediol monoisobutyrate | 15.7 |

The paints were tested for wet adhesion according to the following test.

APPARATUS

Gardner Heavy-Duty Wear Tester with replacement of hog bristle by nylon bristle brushes.
2. Leneta Charts, dull black plastic charts.
3. Glass Base Plate, to hold Leneta Charts
4. Paint or latex drawn-down bar, 3 mil clearance, 6 inches in length.

REAGENTS AND MATERIALS

1. Detergent solution, 2% Triton X-100 in water (octyl phenoxy polyethoxy ethanol available from Rohm & Haas)
2. High gloss, oil based enamel, tinted off-white.
3. SCRUB MEDIUM made as follows:

| | Parts |
|---|---|
| a. Water | 497 |
| b. Hydroxyethyl cellulose (Cellosize WP-4400) | 10 |
| c. Triton X-100 | 20 |
| d. Trisodium Phosphate Anhydrous | 20 |
| e. No.22 Silica, (Whittaker, Clark and Daniels) | 450 |
| f. Acetic acid, glacial | 2 |
| g. Phenyl Mercuric Acetate | 1 |
| Total | 1000 |

Viscosity = 115 to 125 K.U.
pH = 9.5 – 9.7 (adjust with acetic acid)

PROCEDURE

1. A 3 mil drawn-down of the high glass, oil based enamel is made on the full length of a Leneta Chart.
2. Air dry the draw-down for seven days at room temperature.
3. make simultaneous draw-down of a control paint and the test paint across (perpendicular to) the gloss enamel near the center of the chart.
4. Air dry these draw-downs again for seven days at room temperature.
5. Tape the chart to the glass base plate and mount in the Gardner scrub tester.
6. Soak the brush in a 2% solution of Triton X-100 for 30 minutes. Remove and shake vigorously remove excess detergent solution.
7. Spread 10 g. of the scrub medium evenly over the brush bristled.
8. Mount the brush in the holder of the Gardner scrub tester, wet the panel with 5 g. water in the brush path, then begin the test.
9. After each 250 cycles, before failure, add 10 g. scrub medium, remount brush, add 5 g. water on chart in path of brush and continue the test.
10. record the number of cycles to fully remove the paint film in one continuous line across the test paints. Compare results of test paint versus control.
11. When testing a second panel, rinse the brush and pre-soak in 2% Triton X-100 solution for 5 minutes before preparing brush for testing.
12. Terminate test when 1500 scrub cycles have been attained.

The results of the wet adhesion test are as follows:

| Example | Wet Adhesion Scrub Cycles |
|---|---|
| 1 | 160 |
| 2 | 1120 |
| 3 | 1500 + |
| 4 | 1500 + |
| 5 | 1426 |
| 6 | 600 |
| 7 | 269 |

Example 1 contained no hydroxymethyl diacetone acrylamide (HMDAA) and no polyacrylate ester. Example 2 contained HMDAA but no polyacrylate ester. Examples 3,4, and 5 contained both HMDAA and polyacrylate ester within the limits claimed. Examples 6 and 7 contained polyacrylate ester but no HMDAA.

Additional latices were made according to the procedure of Example 1 wherein 40 parts of hexanediol diacrylate and 10 parts of HMDAA were copolymerized with the vinyl acetate and butyl acrylate (Example 8) and wherein 10 parts of HMDAA and 10 parts of pentaerythritol triacrylate were copolymerized (Example 9). When formulated into a paint and tested for wet adhesion as described hereinbefore, the scrub cycles to failure were 760 and 643 respectfully.

It is to be understood that the foregoing detailed description is given merely by way of illustration and that many variations may be made therein without departing from the spirit of the invention.

What is claimed is:

1. An aqueous copolymer dispersion coating composition comprising a copolymer of vinyl acetate dispersed in water in the presence of an anionic or nonionic surfactant or mixture thereof wherein the copolymer contains by weight based on the total weight of the copolymer
   96.5 to 70 percent vinyl acetate;
   3 to 10 percent tri or tetraacrylate or methacrylate ester of pentaerythritol;
   0.5 to 3 percent hydroxymethyl diacetone acrylamide; and
   0 to 26.5 percent other monomer selected from the group consisting of alkyl acrylate or methacrylate esters wherein the alkyl group contains from 1 to 18 carbon atoms and mono- or dialkyl esters of polymerizable unsaturated dibasic acids wherein the alkyl group contains from 1 to 10 carbon atoms.

2. The composition of claim 1 wherein the other monomer is an alkyl acrylte wherein the alkyl group contains 1 to 18 carbon atoms.

3. The composition of claim 2 wherein the other monomer is butyl acrylate.

4. The composition of claim 1 wherein the other monomer is a dialkyl maleate or fumarate wherein the alkyl group contains 1 to 10 carbon atoms.

5. The composition of claim 4 wherein the other monomer is dioctyl maleate.

6. The composition of claim 1 wherein the polyacrylate ester is pentaerythritol triacrylate.

7. The composition of claim 1 wherein the hydroxymethyl diacetone acrylamide is present in the amount of about 1.25 to about 2 weight percent based on the total weight of copolymer.

8. The composition of claim 1 wherein the tri or tetraacrylate or methacrylate ester of pentaerythritil is present in the amount of about 3.5 to about 7 weight percent based on the total weight of copolymer.

* * * * *